United States Patent
Chae et al.

(10) Patent No.: US 9,032,332 B2
(45) Date of Patent: May 12, 2015

(54) CONTROLLING ACCESS TO FEATURES OF A MOBILE COMMUNICATION TERMINAL

(75) Inventors: Jae Young Chae, Seoul (KR); Tae Hun Kim, Incheon (KR); Sang Woon Lee, Seoul (KR); Young Sook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1193 days.

(21) Appl. No.: 12/358,579

(22) Filed: Jan. 23, 2009

(65) Prior Publication Data

US 2009/0222766 A1    Sep. 3, 2009

(30) Foreign Application Priority Data

Feb. 29, 2008    (KR) ........................ 10-2008-0018967

(51) Int. Cl.
| | |
|---|---|
| G06F 3/048 | (2013.01) |
| G06F 3/0482 | (2013.01) |
| G06F 3/0481 | (2013.01) |
| H04M 1/725 | (2006.01) |
| H04M 1/2745 | (2006.01) |

(52) U.S. Cl.
CPC .......... *G06F 3/0482* (2013.01); *G06F 3/04817* (2013.01); G06F 2221/2109 (2013.01); *H04M 1/274508* (2013.01); *H04M 1/27455* (2013.01); *H04M 1/72583* (2013.01)

(58) Field of Classification Search
USPC ....................................................... 715/835
See application file for complete search history.

(56) References Cited

U.S. PATENT DOCUMENTS

| | | | |
|---|---|---|---|
| 6,307,547 B1 * | 10/2001 | Bolnick ........................ | 715/775 |
| 2003/0009484 A1 * | 1/2003 | Hamanaka et al. ........... | 707/200 |
| 2003/0034998 A1 * | 2/2003 | Kodosky et al. .............. | 345/736 |
| 2004/0021647 A1 * | 2/2004 | Iwema et al. ................. | 345/179 |
| 2005/0091272 A1 * | 4/2005 | Smith et al. ................. | 707/104.1 |
| 2007/0013790 A1 * | 1/2007 | Nakase ...................... | 348/231.99 |
| 2007/0055694 A1 * | 3/2007 | Ruge et al. .................. | 707/104.1 |
| 2007/0157089 A1 * | 7/2007 | Van Os et al. ................. | 715/702 |

(Continued)

FOREIGN PATENT DOCUMENTS

| KR | 10-0438578 | 7/2004 |
|---|---|---|
| KR | 10-2006-0065835 | 6/2006 |

OTHER PUBLICATIONS

Folder Guard user guide by Winability Software Corporation, published Jul. 10, 2007.*

(Continued)

*Primary Examiner* — William Bashore
*Assistant Examiner* — Hien Duong
(74) *Attorney, Agent, or Firm* — Lee, Hong, Degerman, Kang & Waimey

(57) ABSTRACT

A mobile terminal comprising a display unit; and a controller configured to selectively display one or more menu icons associated with an object displayed on the display unit, in response to the object being selected, wherein the one or more menu icons have a functional or informational association with the selected object, such that further selection of the menu icons provides additional information about the selected object or establishment of a dynamic relationship between the selected object and the one or more menu icons results in performance of an operation related to the selected object.

25 Claims, 20 Drawing Sheets

(56) References Cited

U.S. PATENT DOCUMENTS

| | | | | |
|---|---|---|---|---|
| 2007/0294231 A1* | 12/2007 | Kaihotsu | ................ | 707/3 |
| 2008/0122796 A1* | 5/2008 | Jobs et al. | ................ | 345/173 |
| 2008/0195961 A1* | 8/2008 | Bae et al. | ................ | 715/769 |
| 2008/0216022 A1* | 9/2008 | Lorch et al. | ................ | 715/847 |
| 2008/0309617 A1* | 12/2008 | Kong et al. | ................ | 345/157 |
| 2009/0167508 A1* | 7/2009 | Fadell et al. | ................ | 340/407.2 |

OTHER PUBLICATIONS

Blog Post on Canon Digital Photography forums Jul. 2007. 3 pages. Internet Wayback Archive.*

Google search NPL published Feb. 2008. 2 pages.*

* cited by examiner

CONTROLLING ACCESS TO FEATURES OF A MOBILE COMMUNICATION TERMINAL

CROSS-REFERENCE TO RELATED APPLICATIONS

Pursuant to 35 U.S.C. §119(a), this application claims the benefit of earlier filing date and right of priority to Korean Patent Application No. 10-2008-0018967, filed on Feb. 29, 2008, the contents of which are hereby incorporated by reference herein in their entirety.

TECHNICAL FIELD

The present disclosure relates to a mobile communication terminal, and more particularly, to a method for controlling access to features of a mobile communication terminal.

BACKGROUND

A mobile communication terminal or mobile terminal is a device which may be configured to perform various functions. Examples of such functions include data and voice communications, capturing images and video via a camera, recording audio, playing music files and outputting music via a speaker system, and displaying images and video on a display. Some mobile terminals include additional functionality which supports game playing, while other mobile terminals are also configured as multimedia players. Mobile terminals may be configured to receive broadcast and multicast signals which permit viewing of contents, such as videos and television programs.

There are ongoing efforts to support and increase the functionality of mobile terminals. Such efforts include software and hardware improvements, as well as changes and improvements in the structural and functional components of the mobile terminal. Many icons may be displayed on a display unit of a mobile terminal to provide various functionalities. At times, the sheer number of displayed icons can confuse a mobile terminal user and make it less convenient for the user to utilize certain features. A system and method is needed to overcome the above problems.

SUMMARY

In accordance with on embodiment, a mobile terminal comprising a display unit; and a controller configured to selectively display one or more menu icons applicable to a selected object displayed on the display unit is provided.

A mobile terminal comprising a display unit; and a controller configured to selectively display one or more menu icons associated with an object displayed on the display unit, in response to the object being selected, wherein the one or more menu icons have a functional or informational association with the selected object, such that further selection of the menu icons provides additional information about the selected object or establishment of a dynamic relationship between the selected object and the one or more menu icons results in performance of an operation related to the selected object.

The controller is further configured to display the one or more menu icons adjacent to or remote from the selected object. The display unit comprises a touchscreen, and wherein the controller allows the selected object to be selected by user interaction with a graphical representation of the object on the touchscreen. When one of the one or more menu icons is selected, the controller is further configured to execute a menu function corresponding to the selected menu icon.

A user may interact with the touchscreen to select the object and dragged and dropped the object on one of the one or more menu icons to establish a dynamic relationship between the selected object and the one or more menu icons. The controller is further configured to allow the one or more menu icons, which are to be displayed, to be selected by a user in advance. The selected object is associated with a contact and user interaction with the object allows the user to access at least one of a name, a phone number, an e-mail address and a homepage address of a contact.

The controller is further configured to display, on the selected object, at least one of the name of the contact, the phone number of the contact, the e-mail address of the contact, the homepage address of the contact, and an image linked with the object associated with the contact. When an image is not linked with the selected object, the controller is configured to indicate that there is no linked image. When an image is not linked with the selected object, the controller is configured to display a preset replacement image on the object. When at least two images are linked with the selected object, the controller is configured to sequentially display the at least two images in association with the selected object.

In one embodiment, the image to be linked with the selected object includes at least one of a still picture, a moving picture, and a flash picture. The controller is further configured to allow a user to lock the selected object. The controller is further configured to provide a lock function to prevent access to information associated with the selected object, when the selected object is in a locked state. The controller is further configured to display an identifier in association with the object to indicate that the object is in a locked state. The controller is further configured to display a plurality of folders on the touchscreen illustrating that the selected object is associated with at least one of the plurality of the folders.

In one implementation, the controller is further configured to apply a lock function to a folder. When objects belonging to a specific one of a plurality of folders are displayed on the touchscreen, the controller is further configured to generate a subfolder and cause the objects to be placed into the subfolder. The controller is further configured to apply a lock function to the subfolder. The controller is further configured to allow an object associated with a phonebook of the mobile terminal to be associated with one of a plurality of the folders. When a first number of objects are associated with a folder, the controller is further configured to prevent additional objects to be associated with the folder.

When an event associated with the selected object takes place, the controller is further configured to display a menu icon of the selected object associated with the event to be visually discriminated from the rest of menu icons. When a plurality objects exist on the touchscreen, the controller is further configured to render the selected object to be visually distinguishable from the rest of the objects.

In accordance with one embodiment, a method of controlling a mobile terminal is provided. The method comprises selecting an object displayed on a display unit; and selectively displaying one or more menu icons applicable to the object.

The present disclosure will become more fully understood from the detailed description given below and the accompanying drawings, which are given by illustration, and thus are not limitative of the present disclosure.

DETAILED DESCRIPTION OF EXAMPLE EMBODIMENTS

Figure 1:
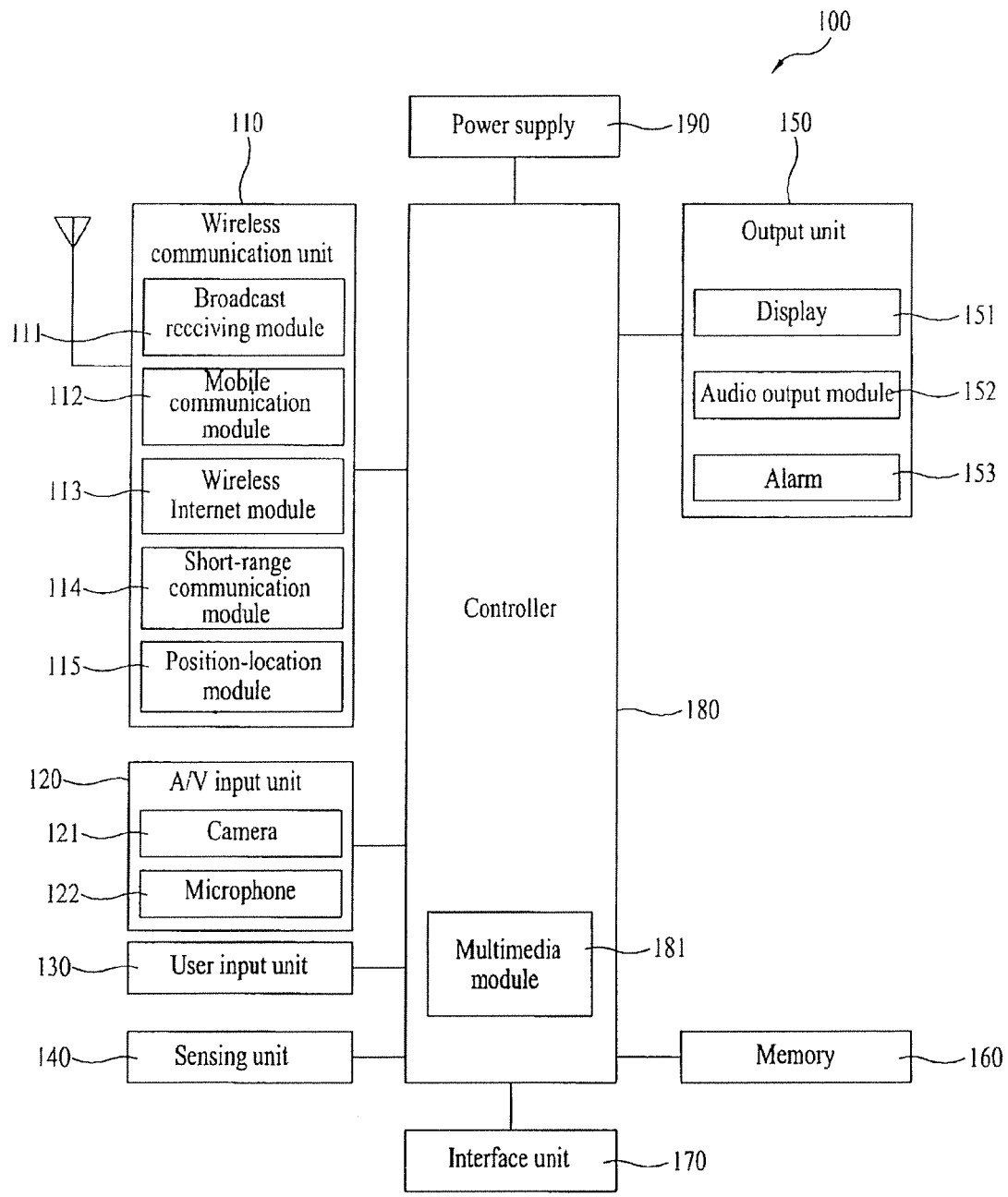
FIG. 1 is a block diagram of a mobile terminal in accordance with one embodiment.

Referring to FIG. 1, a mobile terminal 100 according to one embodiment, may be implemented in various configurations or form factors. Examples of such terminals include mobile phones, smart phones, notebook computers, navigation devices, digital broadcast terminals, personal digital assistants (PDAs), or portable multimedia players.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal 100 is located. In case of non-mobile terminals, the wireless communication unit 110 can be replaced with a wire communication unit. The wireless communication unit 10 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

Examples of broadcast associated information include information associated with a broadcast channel, a broadcast program, a broadcast service provider, etc. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal. The broadcast receiving module 111 may be configured to receive broadcast signals transmitted from various types of broadcast systems.

By way of nonlimiting example, such broadcasting systems may include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data. A wireless internet module 113 supports Internet access for the mobile terminal 100. This module may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module 113 can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth™ and ZigBee™. A position-location module 115 identifies or otherwise obtains the location of the mobile terminal 100. This module may be implemented using, for example, global positioning system (GPS) components which cooperate with associated satellites, network components, and combinations thereof.

According to the current technology, the position-location module 115 is able to precisely calculate current 3-dimensional position information based on longitude, latitude and altitude by calculating distance information and precise time information from at least three satellites and then applying triangulation to the calculated information. Currently, location and time information are calculated using three satellites, and errors of the calculated location position and time information are then amended using another satellite. Additionally, the position-location module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video. A microphone 122 receives an external audio signal while the mobile terminal 100 is in a particular mode, such as phone call mode, recording mode or voice recognition mode. This audio signal is processed and converted into digital data.

The mobile terminal 100, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones 122 and/or cameras 121 may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal 100, a change of position of the mobile terminal 100 or a component of the mobile terminal 100, a presence or absence of user contact with the mobile terminal 100, orientation or acceleration/deceleration of the mobile terminal 100.

If the mobile terminal 100 is configured as a slide-type mobile terminal, the sensing unit 140 may sense whether a sliding portion of the mobile terminal 100 is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal 100 with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display 151 will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One implementation includes the display 151 configured as a touch screen working in cooperation with an input device, such as a touchpad. This configuration permits the display 151 to function both as an output device and an input device. The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more of displays 151.

An example of a two-display embodiment is one in which one display 151 is configured as an internal display viewable when the mobile terminal 100 is in an opened position and a second display 151 configured as an external display viewable in both the open and closed positions. The touchscreen can be configured to detect a touch input pressure as well as a touch input position and size.

A proximity sensor (not shown in the drawing) can be provided within or around the touchscreen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

An example for an operational principle of the proximity sensor is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, a proximity switch is able to detect the object to detect without interference with the material.

In spite of not providing the proximity sensor, if the touchscreen is electrostatic, it can be configured to detect the proximity of a pointer through an electric field change attributed to the proximity of the pointer. So, in the case that the pointer is placed in the vicinity of the touchscreen without being actually contacted with the touchscreen, it is able to detect a position of the pointer and a distance between the pointer and the touchscreen.

For clarity and convenience of explanation, an action for enabling and detecting the pointer approaching but not touching the touchscreen is named 'proximity touch' and an action of enabling and detecting the pointer to actually come into contact with the touchscreen is named 'contact touch'. And, a position, at which the proximity touch is made to the touchscreen using the pointer, means a position of the pointer vertically corresponding to the touchscreen when the pointer makes the proximity touch.

If the proximity sensor is used, it is able to sense a proximity touch and a proximity touch pattern (e.g., proximity touch distance, proximity touch direction, proximity touch speed, proximity touch position, proximity touch moving state, etc.). The sensor is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received. An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video. Moreover, data for various patterns of vibration and/or sound outputted in case of a touch input to the touchscreen can be stored in the memory 160.

As map information can be stored in the memory 160, user's convenience can be further provided in a manner of providing the map information to a user if necessary. Moreover, a recent use history or a cumulative use frequency of each menu in the mobile terminal 100 can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read memory (EEPROM), erasable programmable read memory (EPROM), programmable read memory (PROM), read memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively. A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
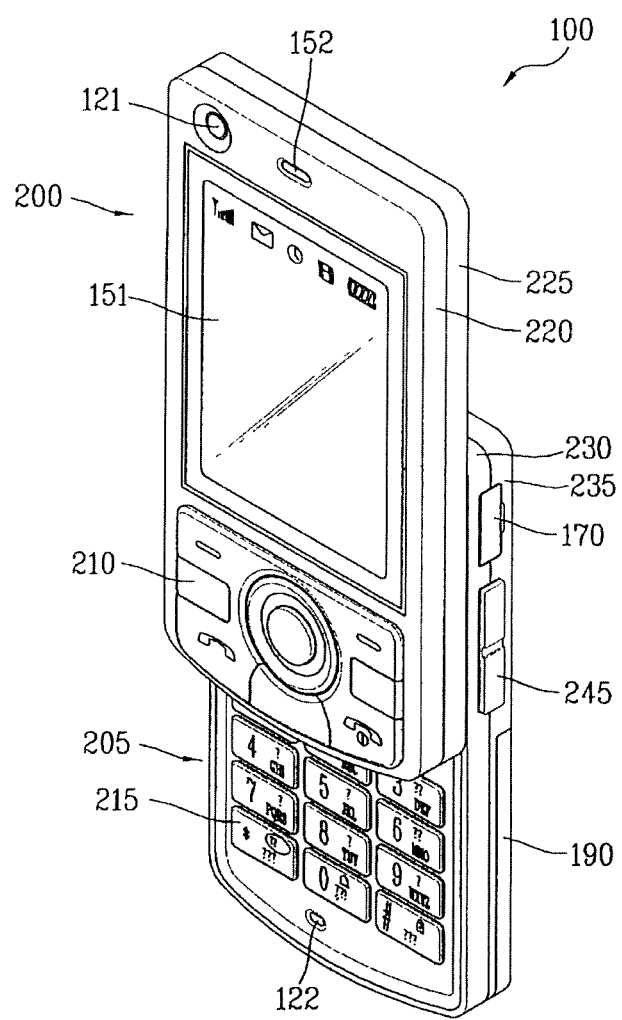
FIG. 2 is a perspective diagram of the face of a mobile terminal according to one embodiment.

Referring to FIG. 2, the mobile terminal 100 is shown having a first body 200 configured to slidably cooperate with a second body 205. The user input unit 130 described in FIG. 1 may include a first input unit such as function keys 210 and four directional keys 210, a second input unit such as keypad 215 and a third input unit such as side keys 245. The function keys 210 are associated with the first body 200, and the keypad 215 is associated with the second body 205. The keypad includes various keys such as numbers, characters, and symbols to enable a user to place a call, prepare a text or multimedia message, and otherwise operate the mobile terminal 100.

The first body 200 slides relative to the second body 205 between open and closed positions. Although not shown in drawings, in case of a folder-type mobile terminal 100, a first body thereof folds and unfolds relative to a second body thereof between open and closed positions. In addition, in the case of a swing-type mobile terminal 100, a first body thereof swings relative to a second body thereof between open and closed positions.

In a closed position, the first body 200 is positioned over the second body 205 in such a manner that the keypad 215 is substantially or completely obscured by the first body 200. In the open position, user access to the keypad 215 is possible. The function keys 210 are conveniently configured for a user to enter commands such as start, stop and scroll. The mobile terminal 100 is operable in either a standby mode, in which it is able to receive a call or message and to receive and respond to network control signaling or an active call mode. Typically, the mobile terminal 100 functions in the standby mode in the closed position and in an active mode in the open position. This mode configuration may be changed as required or desired.

The first body 200 is shown formed from a first case 220 and a second case 225. The second body 205 is shown formed from a first case 230 and a second case 235. The first case 230 and second case 235 are usually formed from a suitably rigid material, such as injection molded plastic, or formed using metallic material, such as stainless steel (STS) and titanium (Ti). One or more intermediate cases may be provided between the first case 230 and second case 235 of one or both of the first body 200 and second body 205. The first body 200 and second body 205 are typically sized to receive electronic components necessary to support operation of the mobile terminal 100.

The first body 200 is shown having a camera 121 and audio output unit 152, which is configured as a speaker, positioned relative to the display 151. The camera 121 may be constructed such that it can be selectively positioned relative to first body 200 such as by rotation or, swiveling. The function keys 210 are positioned adjacent to a lower side of the display 151, which is shown implemented as an LCD or OLED. The display 151 may also be configured as a touch screen having an underlying touchpad which generates signals responsive to user contact with the touchscreen, such as with a finger or stylus.

The second body 205 is shown having a microphone 122 positioned adjacent to the keypad 215 and having side keys 245, which are one type of a user input unit as mentioned above, positioned along the side of second body 205. Preferably, the side keys 245 may be configured as hot keys, such that the side keys are associated with a particular function of the mobile terminal 100. An interface unit 170 is shown positioned adjacent to the side keys 245, and a power supply 190 in a form of a battery is shown located on a lower portion of the second body 205.

Figure 3:
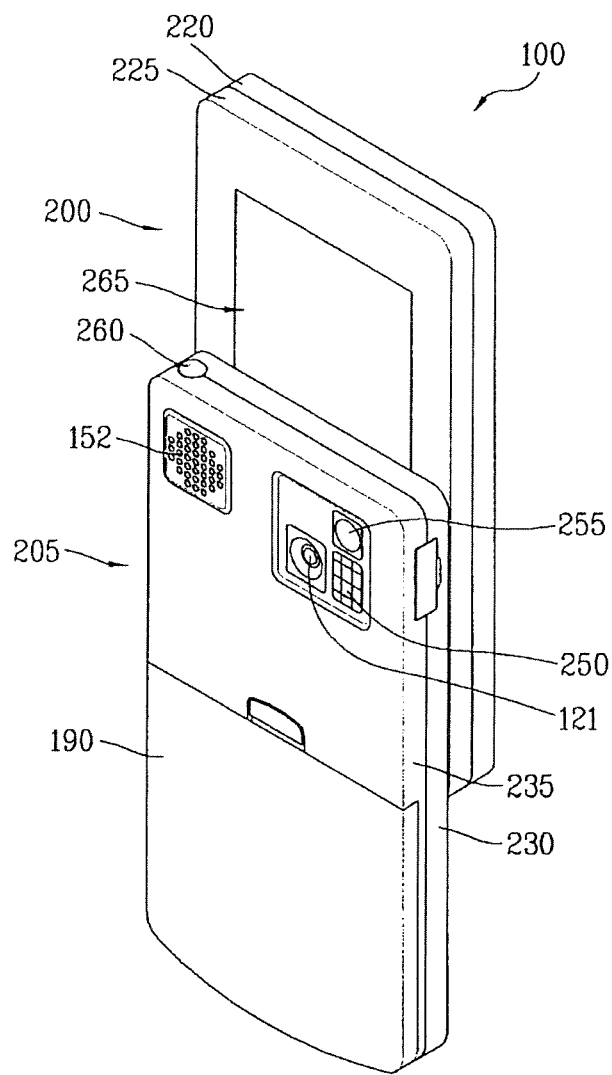
FIG. 3 is a perspective diagram of a rear of the mobile terminal shown in FIG. 2.

FIG. 3 is a rear view of the mobile terminal 100 shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode. The camera 121 of the second body 205 faces a direction which is opposite to a direction faced by the camera 121 of the first body 200 (FIG. 2). Each of the cameras 121 of the first body 200 and second body 205 may have the same or different capabilities.

In one embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 (FIG. 3) is useful for obtaining higher quality pictures for later use or for communicating with other parties. The second body 205 may also include an audio output module 152 located on an upper side of the second body 205 and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205. The antenna 260 functions in cooperation with the broadcast receiving module 111 (FIG. 1). The antenna 260 may be fixed or configured to retract into the second body 205. The rear side of the first body 200 includes a slide module 265, which slidably couples with a corresponding slide module located on the front side of the second body 205. It is understood that the illustrated arrangement of the various components of the first body 200 and second body 205 may be modified as required or desired. In general, some or all of the components of one body may alternatively be implemented on the other body. In addition, the location and relative positioning of such components are not critical to many embodiments, and therefore, the components may be positioned at locations which differ from those shown by the representative figures.

The mobile terminal 100 of FIGS. 1-3 may be configured to operate within a communication system which transmits data via frames or packets, including both wireless and wired communication systems, and satellite-based communication systems. Such communication systems utilize different air interfaces and/or physical layers. Examples of air interfaces utilized by the communication systems include example, frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
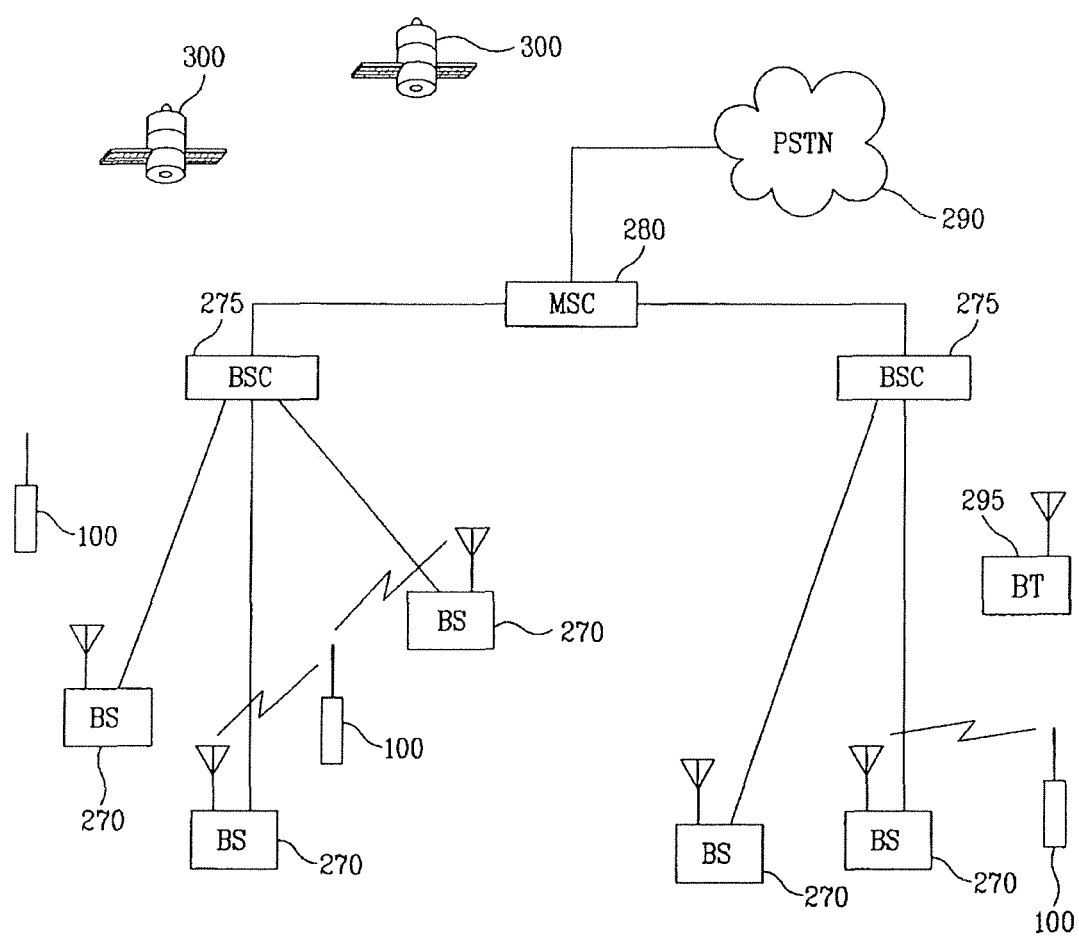
FIG. 4 is a block diagram of a wireless communication system in which a mobile terminal according to the present disclosure is operable.

Referring to FIG. 4, a CDMA wireless communication system is shown having a plurality of mobile terminals 100, a plurality of base stations 270, a plurality of base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omni directional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz). The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above. FIG. 4 further depicts several global positioning system (GPS) satellites 300. Such satellites facilitate locating the position of some or all of the mobile terminals 100. Two satellites are depicted, but it is understood that useful positioning information may be obtained with greater or fewer satellites.

The position-location module 115 (FIG. 1) of the mobile terminal 100 is typically configured to cooperate with the satellites 300 to obtain desired position information. It is to be appreciated that other types of position detection technology, such as location technology that may be used in addition to or instead of GPS location technology, may alternatively be implemented. Some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, and other communications. Each reverse-link signal received by a given base station 270 is processed within that base station 270. The resulting data is forwarded to an associated BSC 275. The BSC 275 provides call resource allocation and mobility management functionality including soft handoffs between the base stations 270. The BSCs 275 also route the received data to the MSC 280, which provides additional routing services for interfacing with the PSTN 290.

Similarly, the PSTN 290 interfaces with the MSC 280, and the MSC 280 interfaces with the BSCs 275. The BSCs 275 control the base stations 270 to transmit sets of forward-link signals to the mobile terminals 100. In the following description, a control method applicable to the above-configured mobile terminal 100 is explained with respect to various embodiments. It is understood that the following embodiments can be implemented independently or through combinations thereof. If the display module 151 includes a touchscreen, the following embodiments are implemented more easily. Hereinafter, a display module 151 screen of the touchscreen shall be indicated by a reference number 400.

Figure 5:
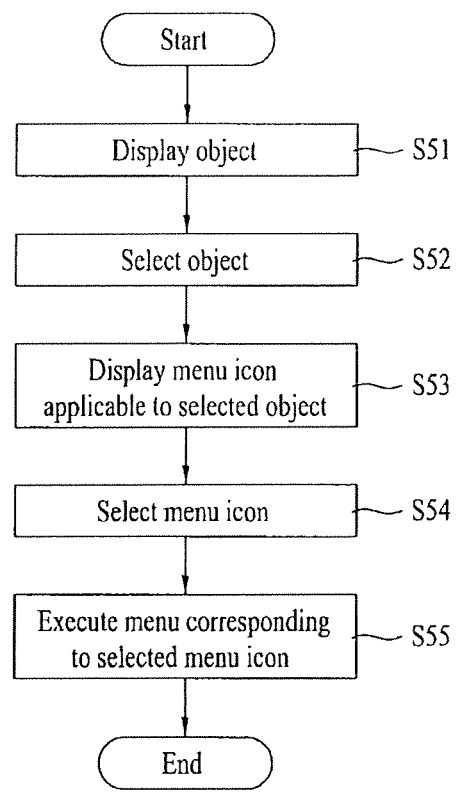
FIG. 5 is a flowchart of a method of controlling a mobile terminal according to a first embodiment.
Figure 6:
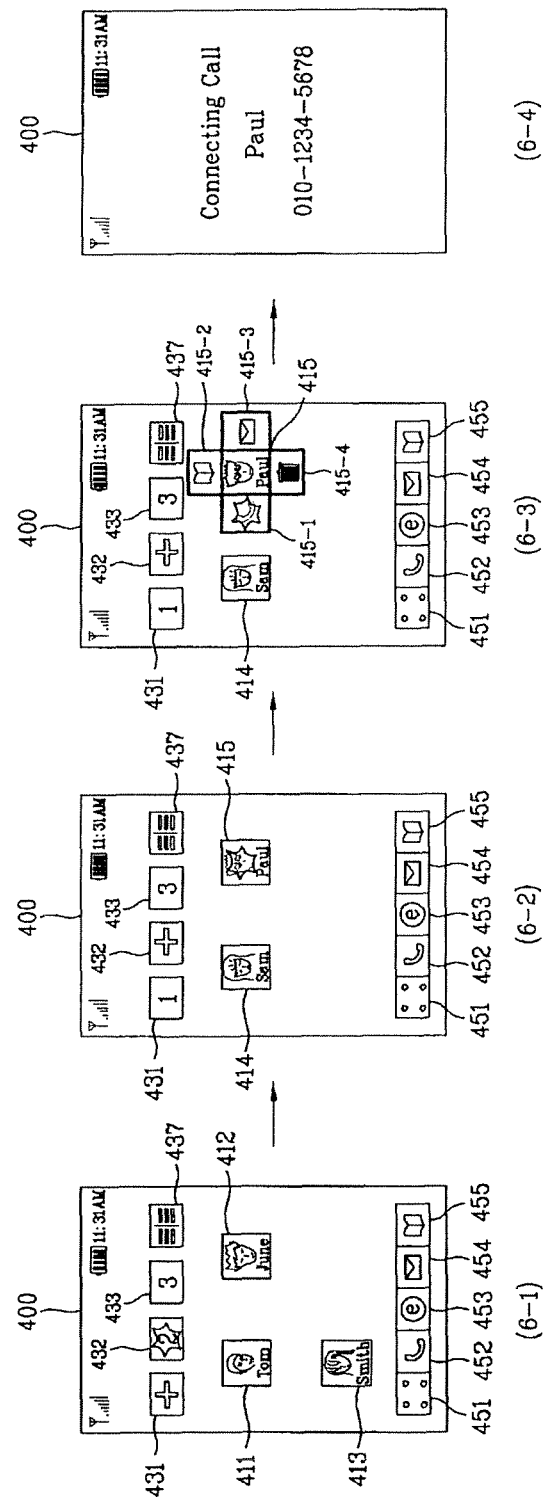
FIG. 6 is a diagram of a display screen on which a method of controlling a mobile terminal according to a first embodiment is implemented.

Referring to FIG. 5 and FIG. 6, one or more objects 411, 412 and 413 are displayed as icons on the touchscreen 400 [S51]. In this disclosure, the objects 411, 412 and 413 mean targets (or subjects) for various menus of the mobile terminal 100. For instance, a target for a phone call menu, a message sending menu or the like is a contact in a phonebook. A target for a multimedia file (e.g., still picture file, moving picture file, music file, etc.) play menu may be a multimedia file. Therefore, the object is the generic term referring to an entry in the phonebook, a media file or the like. For clarity and convenience, here after we discuss with reference to an entry in a phonebook or a contacts database.

Various kinds of information (e.g., phone number, name, image, homepage, e-mail address, messenger address, etc.) may be associated with an entry of the phonebook. The object may be linked to a message (e.g., SMS, MMS, E-mail, etc.), a call history, or an image. In (6-1) of FIG. 6, an image and name of a contact are displayed on the icon of the object. By non-limiting the examples for the present embodiment, a phone number, an e-mail address, a name and the like can be configured to be displayed on the icon of the corresponding object together with or instead of the image and name of the contact, when a user wants so. In particular, a mobile terminal 100 user is able to set the information to be displayed on the object in advance.

Moreover, the objects 411, 412 and 413 can be displayed by being discriminated from each other per folder. In (6-1) of FIG. 6, first to third folders 431, 432 and 433 are exemplarily displayed as icons on the touchscreen 400. In the icon of the first folder 431, '+' is represented instead of '1', which means in (6-1) of FIG. 6 that the first folder 431 among the three folders is currently selected and activated and that the objects 411 to 413 belong to the first folder 431. A sorting icon 437 is exemplarily displayed next to the first to third folders 431 to 433. The sorting icon 437 is provided to sort the objects within the activated folder in prescribed order. This will be explained later.

In (6-1) of FIG. 6, first to fifth representative menu icons 451 to 455 are exemplarily displayed on the touchscreen 400 to directly activate menus frequently used within the mobile terminal 100. The first representative menu icon 451 is for menu manipulation, the second representative menu icon 452 is for a phone call connection, the third representative menu icon 453 is for a wireless Internet access, the fourth representative menu icon 454 is for message transmission/reception, and the fifth representative menu icon 455 is for a phonebook.

The configuration of the touchscreen 400, as shown in (6-1) of FIG. 6, can appear when the mobile terminal 100 is in standby mode or when the mobile terminal 100 enters a prescribed menu. The second folder icon 432 is selected for the activation of the second folder by being touched by a pointer (e.g., finger, stylus pen, etc.). If so, referring to (6-2) of FIG. 6, the second folder is activated. As '+' mark is displayed on the second folder 432, it indicates that the second folder has been activated and that objects 414 and 415 belonging to the second folder are displayed. Subsequently, one of the objects 414 and 415 belonging to the second folder is touched and selected [S52].

If so, referring to (6-3) of FIG. 6, first to fourth menu icons 415-1, 415-2, 415-3 and 415-4 applicable to the selected object 415 are displayed around the selected object 415 [S53]. In (6-3) of FIG. 6, exemplarily shown is that there are four menu icons applicable to the selected object 415. This number is used by way of non-limiting example for the present embodiment, and it should be understood that greater or fewer menu icons may be displayed. Moreover, menu icons displayable for the selected object 415 can be configured to be set in advance by a mobile terminal 100 user.

It is not mandatory for the menu icons to be displayed around the selected object 415. Instead, the menu icons can be displayed remote from the selected object 415 on the touchscreen 400. Examples for menus applicable to the selected object 415 can include phonebook (personal information) editing, phone connection, message sending/reception, object deletion, sent/received message viewing, call history viewing, homepage connection, memo writing, messenger connection, video call connection, and the like. Optionally, the selected object 415 is displayed visually thicker than the non-selected object 414 to facilitate a mobile terminal 100 user to visually recognize the selected object 415.

In one embodiment, the first menu icon 415-1 is for a phone connection, the second menu icon 415-2 is for a phonebook editing, the third menu icon 415-3 is for a message sending/reception, and the fourth menu icon 415-4 is for an object deletion. The first menu icon 415-1 is touched and selected from the displayed menu icons [S54]. If so, referring to (6-4) of FIG. 6, a phone call is tried to a contact of the selected object 415 [S55]. Yet, after the selected object 415 has been selected in (6-3) of FIG. 6, if one of the first to fourth menu icons 415-1, 415-2, 415-3 and 415-4 is not selected for a prescribed period of time, the touchscreen can go back to the image shown in (6-2) of FIG. 6.

Another scheme for selecting the first menu icon 415-1 of the object 415 is provided below with reference to FIG. 7 as follows. Referring to (7-1) of FIG. 7, objects 414 and 415 are displayed on the touchscreen 400. Referring to (7-2) of FIG. 7, an object 415 is touched or selected (e.g., by user interaction with a pointing device or the touchscreen). In one embodiment, if the selection or touching is beyond a first threshold, menu icons 415-1, 415-2, 415-3 and 415-4 are displayed around the touched object 415 on the touchscreen 400.

Figure 7:
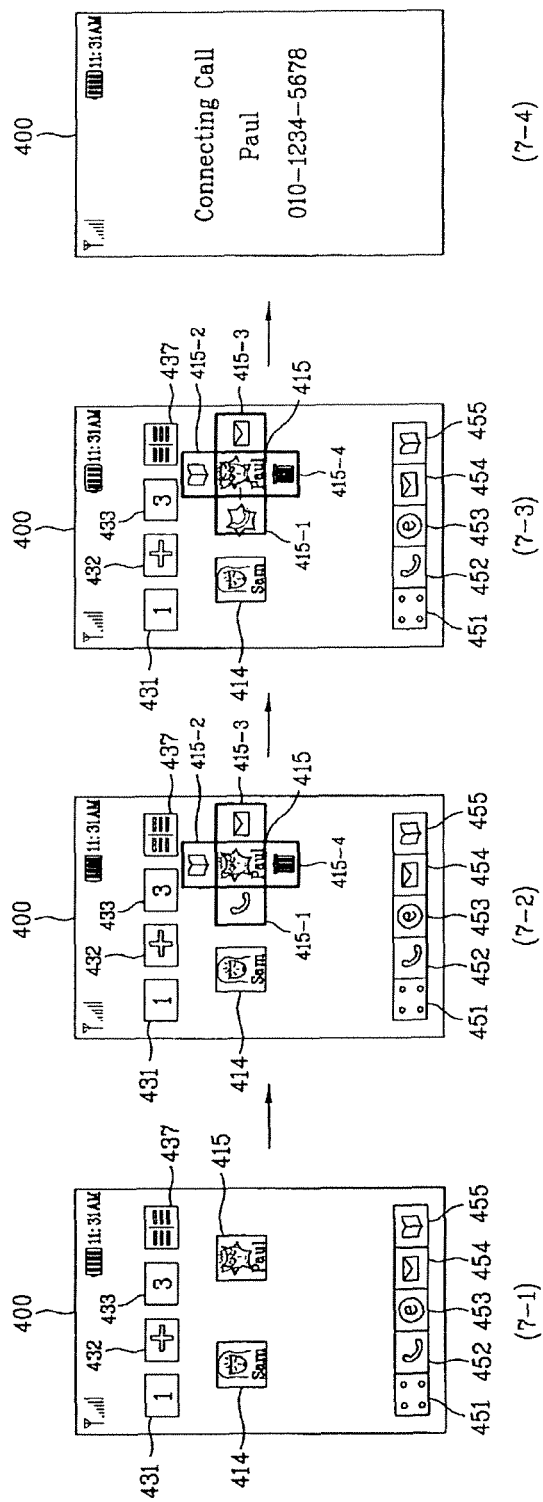
FIG. 7 is another diagram of a display screen on which a method of controlling a mobile terminal according to a first embodiment is implemented.

Referring to (7-3) and (7-4) of FIG. 7, the touched object 415 may be dragged and dropped on the first menu icon 415-1 to make a phone call to a contact associated with the touched object 415. Alternatively object 415 may be dragged and dropped on the second menu icon 415-2 to add information about that contact to a phonebook, or may be dragged and dropped on the third menu icon 415-3 so that a message can be composed and sent to the contact associated with the touched object 415, or may be dragged and dropped on the fourth menu icon 415-4 so as to delete the touched object 415.

Figure 8:
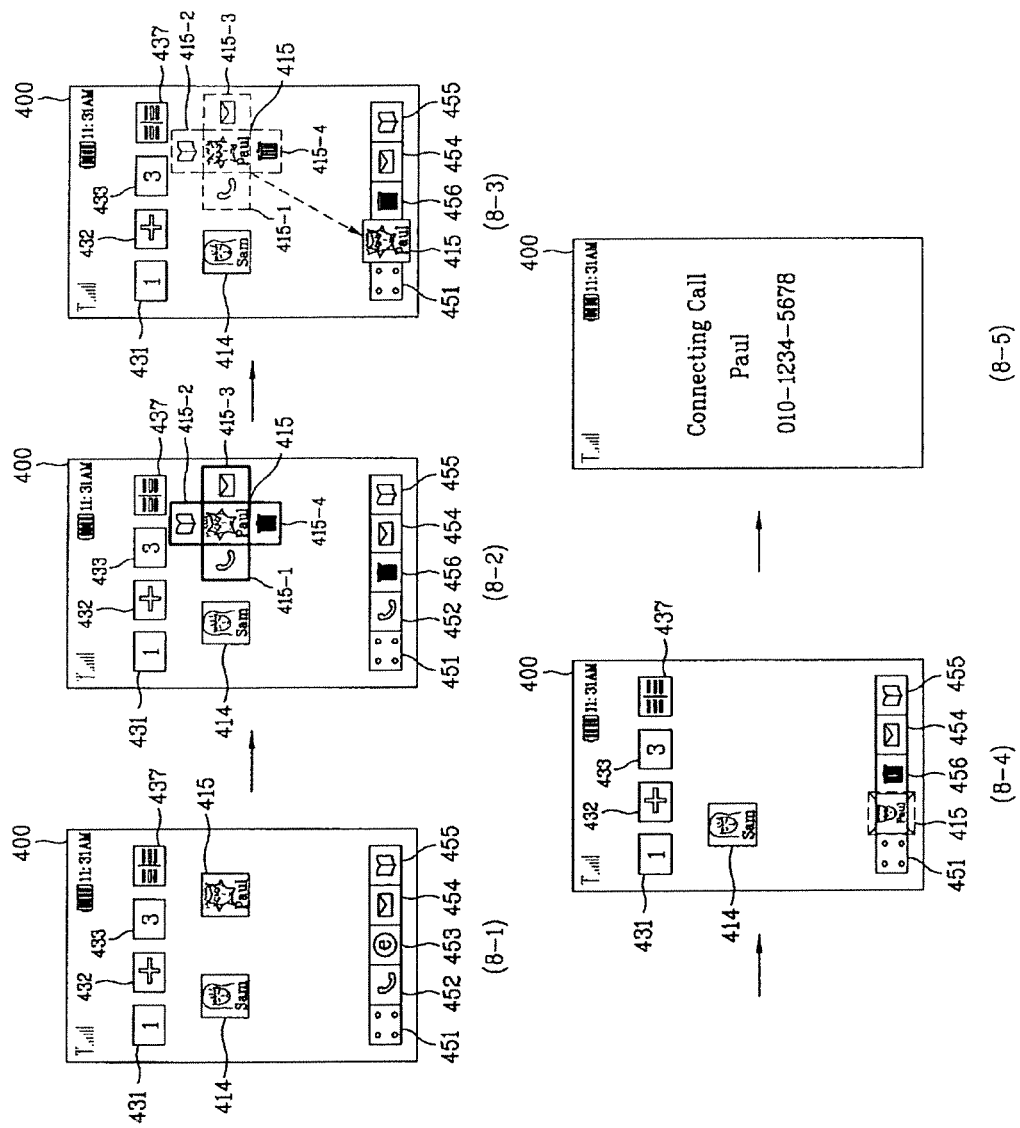
FIG. 8 is another diagram of a display screen on which a method of controlling a mobile terminal according to a first embodiment is implemented.

Referring to (8-1) of FIG. 8, objects 414 and 415 are displayed on the touchscreen 400. First to fifth representative menu icons 451 to 455 are further displayed on the touchscreen 400. Referring to (8-2) of FIG. 8, when an object 415 is touched, a menu icon 453, with which object 415 is not associated or applicable, among the first to fifth representative menu icons 451 to 455 become inactive or disappears for example. In one embodiment, the other menu icons (e.g., icons 451, 452) that are applicable to the object 415 remain active and are displayed on the touchscreen 400. In (8-2) of FIG. 8, a menu icon 456 for object deletion is displayed on the touchscreen 400 by replacing the third representative menu icon 453 for wireless Internet.

Referring to (8-3) of FIG. 8, the specific object 415 may be dragged and dropped on the second representative menu icon 452 for example. Referring to (8-4) of FIG. 8, the size of the specific object 415 may be modified (e.g., reduced or enlarged) to fit that of the second representative menu icon 452 and to indicate that the corresponding object 415 has been successfully dragged and dropped on the second representative menu icon 452. Together with or separate from this, it is able to configure that vibration and/or sound is generated to announce that the specific object 415 is correctly dragged to the second representative menu icon 452.

If so, referring to (8-5) of FIG. 8, it is attempted to make a phone call to a contact of the specific object 415. As mentioned in the above description for FIG. 8, it is explained that a single object is dragged. By non-limiting the examples for the present embodiment, for example, at least two objects are simultaneously touched and then dragged to one of the first to fifth representative menu icons, whereby a menu corresponding to the dragged and selected menu icon can be simultaneously executed for the at least two objects. The aforesaid object sorting icon 437 is explained in detail with reference to FIG. 9 as follows.

Figure 9:
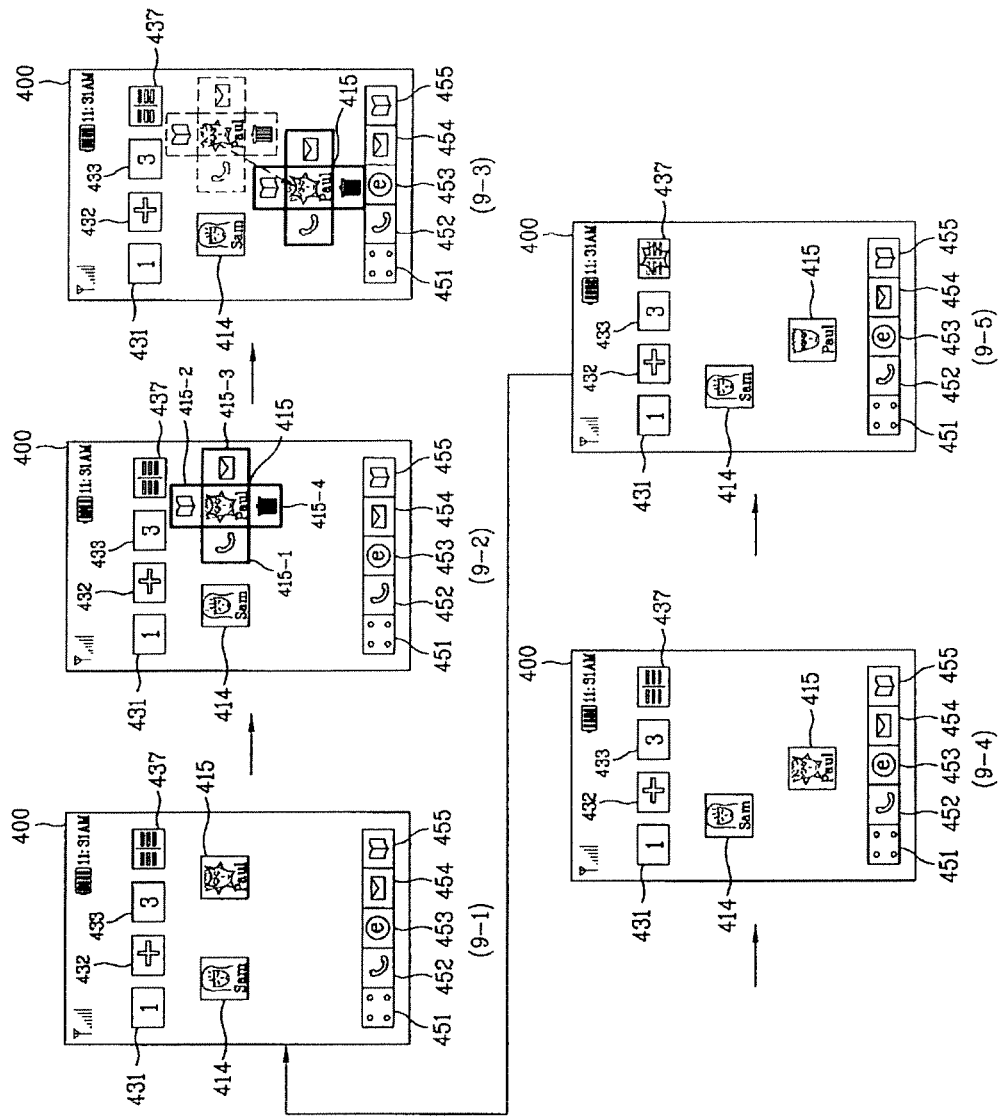
FIG. 9 is another diagram of a display screen on which a method of controlling a mobile terminal according to a first embodiment is implemented.

Referring to (9-1) of FIG. 9, objects 414 and 415 are displayed on the touchscreen 400. In this case, the objects 414 and 415 are displayed in a manner of being sorted according to a preset rule. Subsequently, a selected object 415 is selected by being touched. Referring to (9-2) of FIG. 9, as mentioned in the foregoing description, menu icons corresponding to the selected object 415 are displayed around the selected object 415. Referring to (9-2) and (9-3) of FIG. 9, the selected object 415 is dragged to a specific position within the touchscreen 400. Referring to (9-4) of FIG. 9, the selected object 415 keeps being displayed at the specific position.

In one implementation, each of the objects on the touchscreen 400 can be shifted to a prescribed position by being touched and dragged. Referring to (9-5) of FIG. 9, the object sorting icon 437 is selected by being touched. If so, the selected object 415 shifted by being dragged, as shown in (9-1) of FIG. 9, is shifted to the position according to the preset rule. That is, if the object sorting icon 437 is selected, although the objects have been shifted to random positions, the shifted objects are displayed by being sorted again according to the present rule. In the following description, the setting of an image displayed on the object is explained in detail with reference to FIG. 10.

Figure 10:
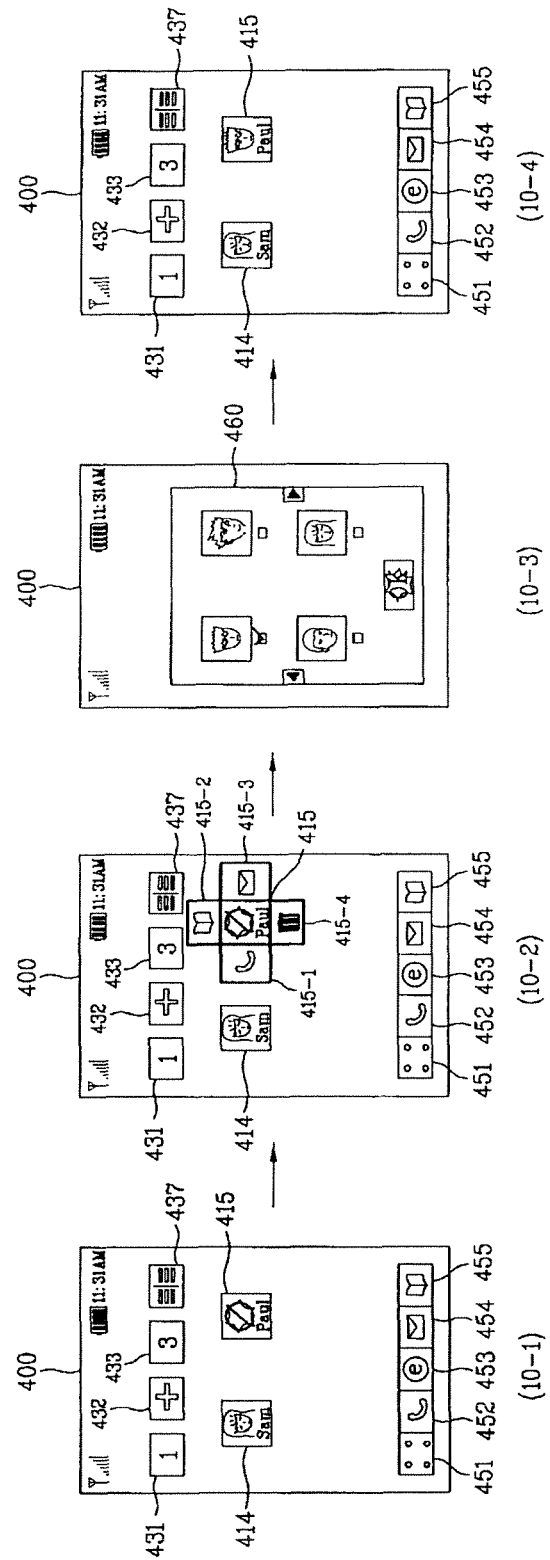
FIG. 10 is another diagram of a display screen on which a method of controlling a mobile terminal according to a first embodiment is implemented.

Referring to (10-1) of FIG. 10, an object 415 is displayed on the touchscreen 400. In this case, a corresponding image is not linked with the object 415 yet. Therefore, a mark or a replacement image for indicating that the corresponding image is not yet linked is displayed on the object 415. If the object 415 is touched, corresponding menu icons, as shown in (10-2) of FIG. 10, are formed around the object 415. Subsequently, the object 415 is touched again. Then, a list window 460 of images stored within the mobile terminal 100, as shown in (10-3) of FIG. 10, is displayed on the touchscreen 400. In this case, the image may include a still picture, a moving picture, a flash picture and the like.

One of the images is selected from the list window 460. Then, the selected image, as shown in (10-4) of FIG. 10, is displayed on the object 415. If the selected image is the moving picture or the flash picture, it is able to configure the selected moving picture or the selected flash picture to be displayed for the object 415. Meanwhile, it is able to configure that at least two images can be simultaneously selected from the list window 460. In this case, it is able to configure the selected at least two images to be sequentially displayed for the object 415.

In the above example embodiment, when an image is not linked with the object 415, a user may select an image from the images stored in the mobile terminal 100 and cause it to be linked with the object 415. By way of non-limiting example, an image may be downloaded via website accessed through wireless Internet and linked with the object 415. Moreover, an image newly captured by a camera unit can be configured to be linked with the object 415.

Figure 11:
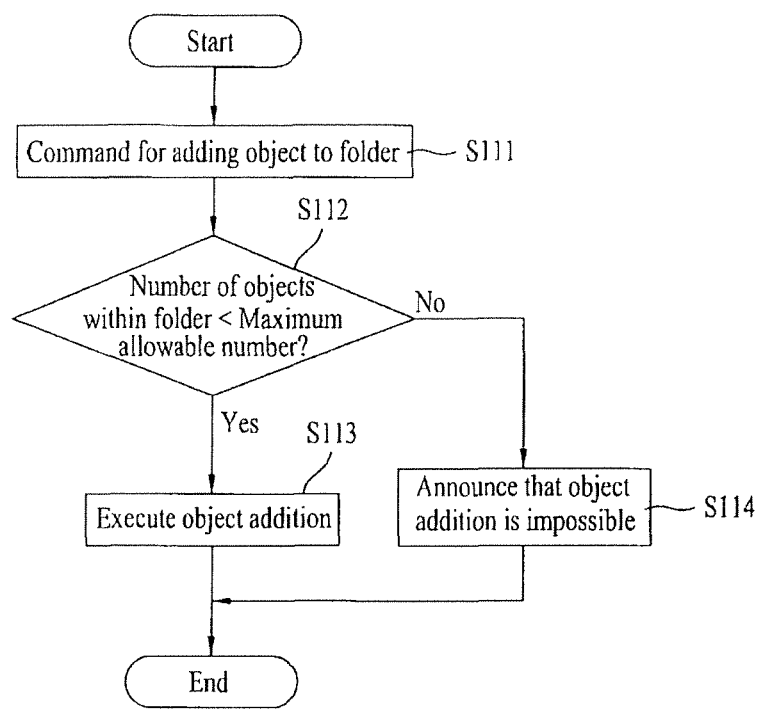
FIG. 11 is a flowchart of a method of controlling a mobile terminal according to a second embodiment.
Figure 12:
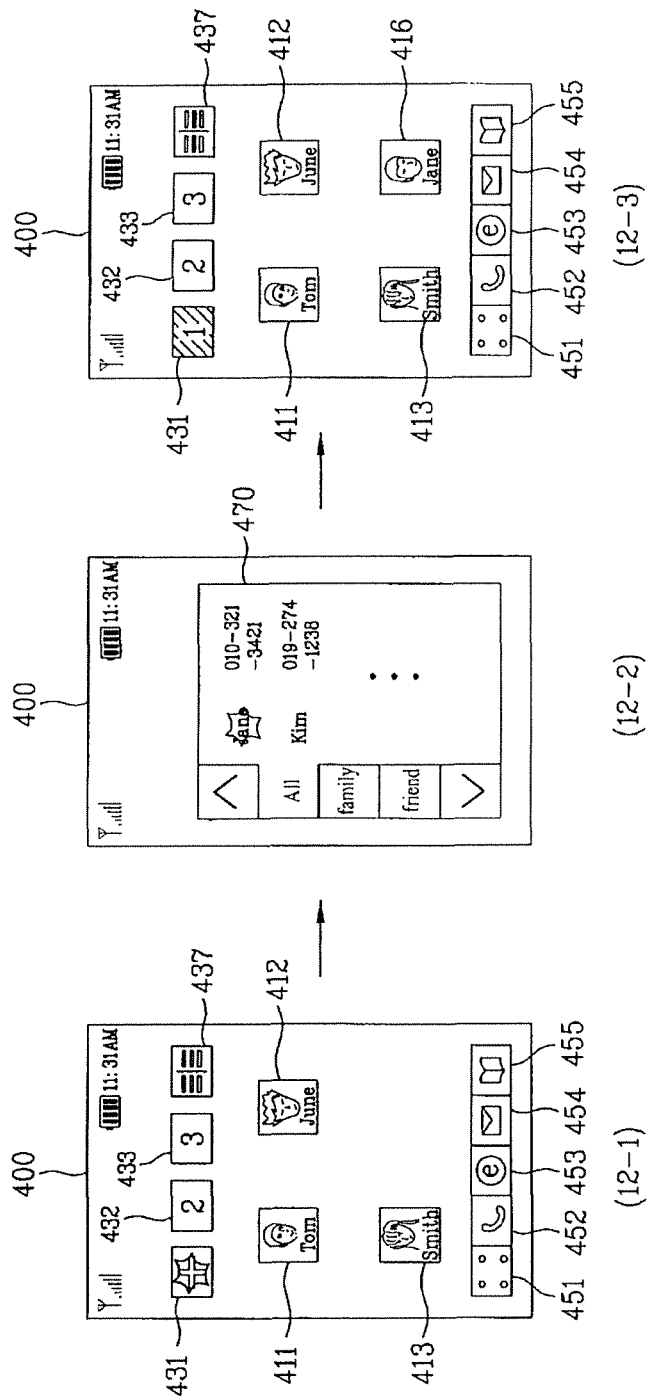
FIG. 12 and FIG. 13 are diagrams of a display screen on which a method of controlling a mobile terminal according to a second embodiment is implemented.

Referring to FIGS. 11 and 12, in one embodiment, a first folder may be activated on the touchscreen 400, whereby objects 411, 412 and 413 belonging to the first folder are displayed on the touchscreen 400. Referring to FIG. 11, a first folder icon 431 is touched [S111]. If so, a phonebook 470 of the mobile terminal 100, as shown in (12-1) of FIG. 12, is displayed on the touchscreen 400. One contact is selected from the phonebook 430 [S111]. If so, the selected contact, as shown in (12-3) of FIG. 12, is displayed as a new object 416 within the first folder on the touchscreen [S112, S113].

Meanwhile, a maximum number of objects, which can belong to the corresponding folder, can be preset. If too many objects belong to the folder, a mobile terminal 100 user may have difficulty in searching the folder for a specific object. In (12-3) of FIG. 12, an example is illustrated in which the maximum number of displayed objects is 4. In one embodiment, if an indicator (e.g., the mark '+') on the first folder icon 431 disappears, a mobile terminal 100 user is informed that no more objects will belong to the first folder. It can be configured that the first folder icon 431 is visually distinguishable from other folder icons 432 and 433 when the mark '+' disappears from the first folder icon 431 and a mark '1' appears on the first folder icon 431.

When the phonebook is stored as a folder type shown in (12-2) of FIG. 12, the first to third folders match different one of folders of the phonebook, respectively. If one of the first to third folders is touched, it is able to configure that an object is directly generated from the matched phonebook folder. Referring to (13-1) of FIG. 13, a second folder is activated on the touchscreen 400 and objects 414 and 415 belonging to the second folder are displayed on the touchscreen 400.

Figure 13:
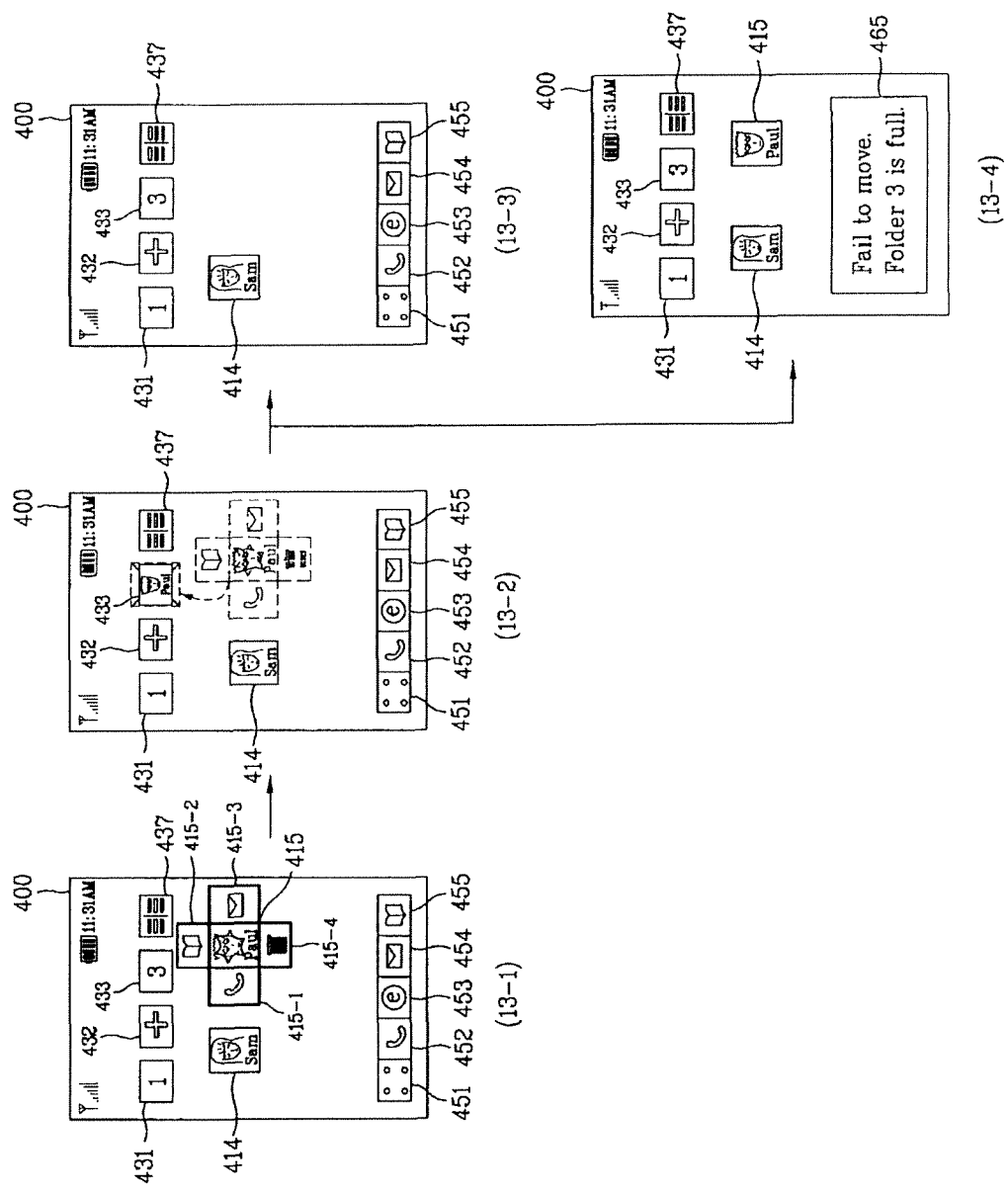
Figure 14:
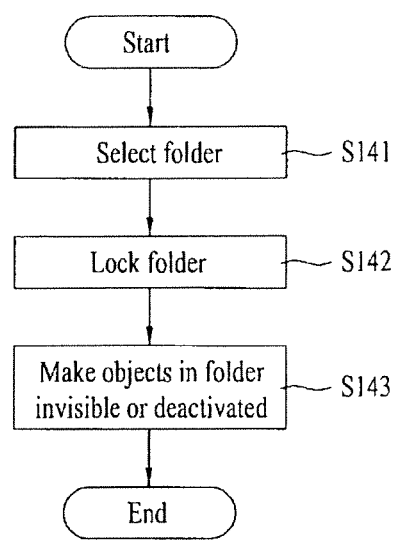
FIG. 14 is a flowchart of a method of controlling a mobile terminal according to a third embodiment.

Referring to (13-1) and (13-2) of FIG. 13, selected object 415 is selected by being touched and is then dragged to a specific folder, i.e., a third folder icon 433 [S111]. If so, a size of the selected object 415 is reduced (or enlarged) to be fit for that of the third folder icon 433 to indicate that the corresponding selected object 415 is correctly dragged to the third folder icon 433. Together with or separate from this, it is able to configure that vibration and/or sound is generated to announce that the selected object 415 is correctly dragged to the third folder icon 433.

If a maximum number of objects is not occupying the third folder, the selected object 415 is shifted to the third folder, as shown in (13-3) of FIG. 13. Therefore, the selected object 415 fails to be shown in the second folder any more [S112. S113]. Yet, if a maximum number of objects have already occupied the third folder, the selected object 415, as shown in (13-4) of FIG. 13, remains within the second folder instead of being shifted to the third folder. And, it is able to configure the touchscreen 400 to display announcement for announcing that the shift of the selected object 415 has failed due to the maximum number of objects within the second folder [S112, S114]. Together with or separate from this, it is able to configure that vibration and/or sound is generated to announce that the shift of the selected object 415 has failed.

Figure 15:
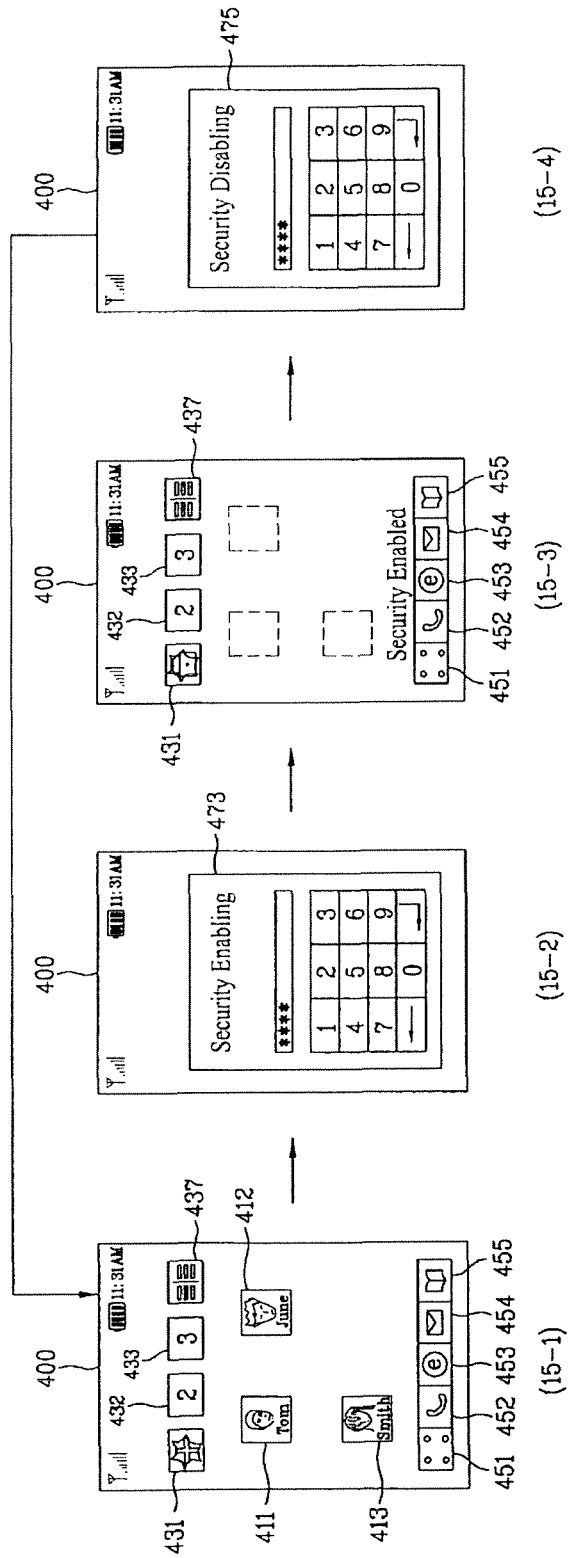
FIG. 15 and FIG. 16 are diagrams of a display screen on which a method of controlling a mobile terminal according to a third embodiment is implemented.

Referring to (15-1) of FIG. 15, a first folder is activated on the touchscreen 400 and objects 411, 412 and 413 belonging to the first folder 431 are displayed on the touchscreen 400. First of all, a first folder icon 431 is touched double [S141]. If so, referring to (15-2) of FIG. 15, a window 473 for setting a security function (a lock function) is displayed on the touchscreen 400. In this case, a virtual numeral keypad is displayed in the security function setting window 473. Hence, a mobile terminal 100 user inputs a password, which was preset in the mobile terminal 100, through the virtual numeral keypad.

If the password is inputted, the first folder enters a security function set mode [S142]. Therefore, referring to (15-3) of FIG. 15, a shape of the first folder icon 431 is changed to inform the mobile terminal 100 user that the security function has been set. Referring to (15-3) of FIG. 15, the fact that the security function for the objects within the first folder has been set is made to be clearly displayed in a manner that the objects 411, 412 and 413 within the first folder are made invisible or in a manner that outlines of the objects 411, 412 and 413 within the first folder are displayed only [S143]. Moreover, since the objects are deactivated, even if the mobile terminal 100 user touches the outlines of the objects, the objects do not respond to the touch [S143].

Subsequently, referring to (15-3) of FIG. 15, the first folder icon 431 is touched double again. If so, referring to (15-4) of FIG. 15, a window 475 for releasing the security function (lock function) is displayed. In this case, a virtual numeral keypad is displayed in the security function releasing window 475. Hence, the mobile terminal 10 user inputs a password, which was preset in the mobile terminal 100, through the virtual numeral keypad. If so, the first folder enters a security function released mode. Therefore, shapes of the first folder icon 431 and the objects 411, 412 and 413 of the first folder, as shown in (15-1) of FIG. 15, return to their original shapes. Another scheme for facilitating a security function to be set for all objects within the first folder is explained in detail with reference to FIG. 16.

Figure 16:
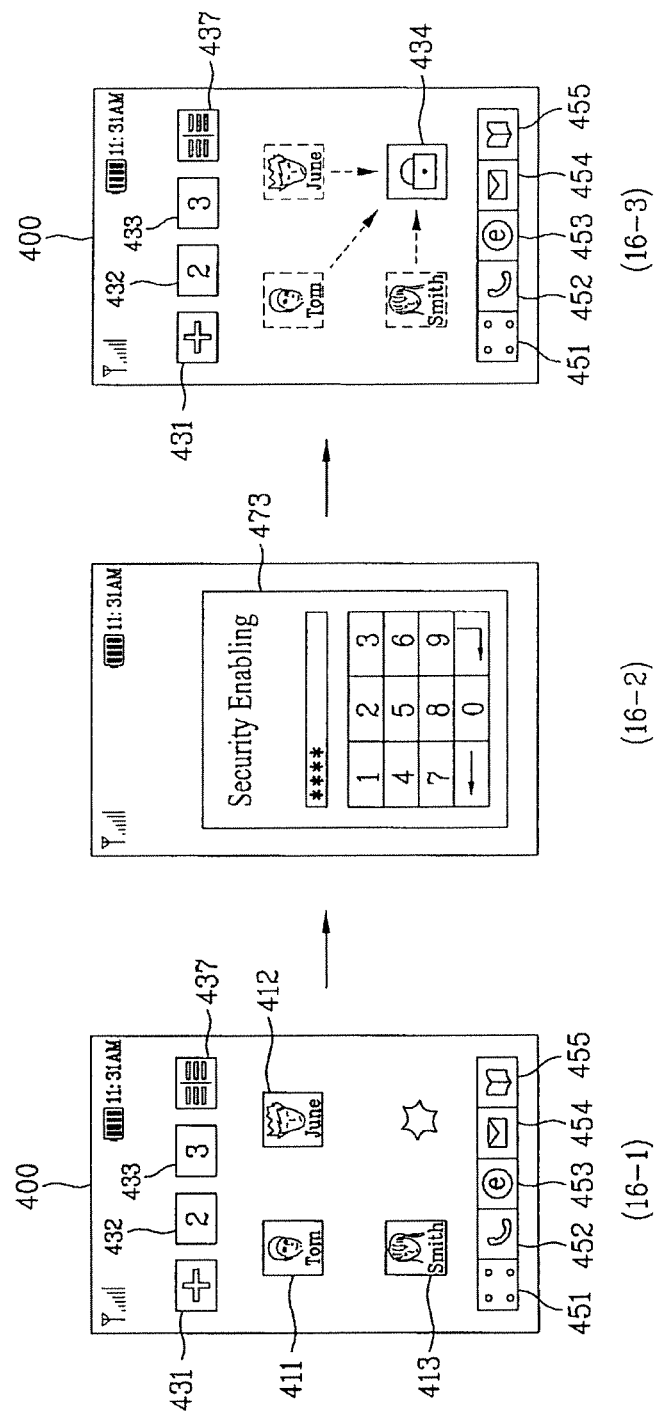

Referring to (16-1) of FIG. 16, a first folder is activated on the touchscreen 400 and objects 411, 412 and 413 belonging to the first folder 431 are displayed on the touchscreen 400. First of all, an empty area on the touchscreen 400 is touched double. In this case, it is not mandatory for the double touch to be performed on the empty area. Instead, it is able to configure the touch to be performed on a preset area on the touchscreen 400. If so, referring to (16-2) of FIG. 16, a window 473 for setting a security function (a lock function) is displayed on the touchscreen 400. In this case, a virtual numeral keypad is displayed in the security function setting window 473. Hence, a mobile terminal 100 user inputs a password, which was preset in the mobile terminal 100, through the virtual numeral keypad.

If so, referring to (16-3) of FIG. 16, a subfolder icon 434 is generated within the first folder and the objects within the first folder gather into the subfolder. In this case, the subfolder icon 434 has a shape capable of announcing that the security function has been set. Hence, it is unable to use the objects 411, 412 and 413 until the security function of the subfolder is released. The security function of the subfolder is released in a manner similar to that mentioned in the foregoing description. In particular, if the subfolder is touched double, the window for releasing the security function is displayed. If a password is inputted through the window, the security function is released. This is apparent to those skilled in the art without corresponding drawings. For clarity of this disclosure, its details and drawings are omitted in the following description.

Figure 17:
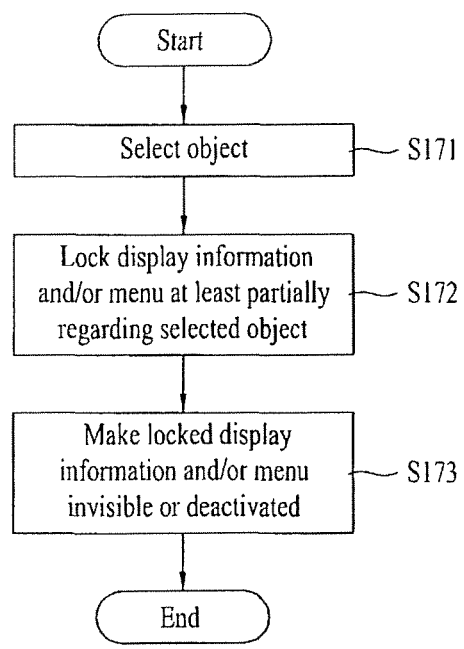
FIG. 17 is a flowchart of a method of controlling a mobile terminal according to a fourth embodiment.
Figure 18:
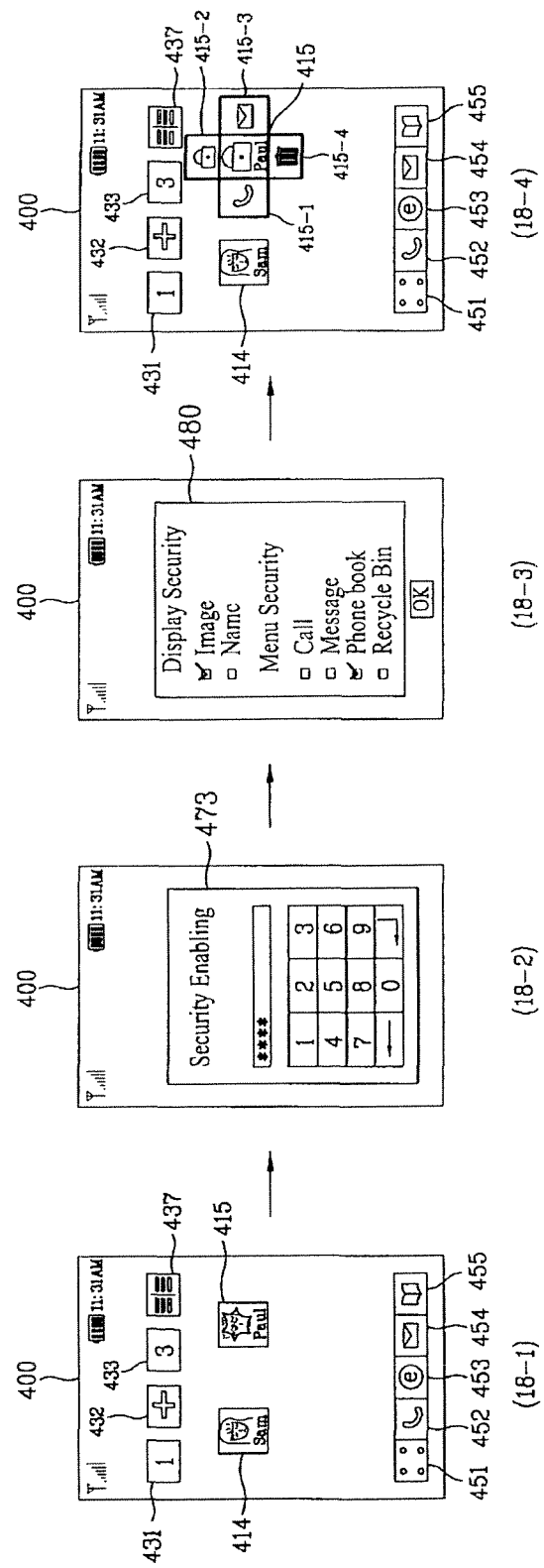
FIG. 18 is another diagram of a display screen on which a method of controlling a mobile terminal according to a fourth embodiment is implemented.

Referring to (18-1) of FIG. 18, a second folder is activated on the touchscreen 400 and objects 414 and 415 belonging to the second folder 431 are displayed on the touchscreen 400. Referring to FIG. 17, a specific object 415 is touched double [S171]. If so, referring to (18-2) of FIG. 18, a window 473 for setting a security function (a lock function) is displayed on the touchscreen 400. In this case, a virtual numeral keypad is displayed in the security function setting window 473. Hence, a mobile terminal 100 user inputs a password, which was preset in the mobile terminal 100, through the virtual numeral keypad. If so, referring to (18-3) of FIG. 18, an option list window 480 for setting a security function for the object 415 is displayed on the touchscreen 400.

In the option list window 480, it is able to set a security function per displayable item on the object 415 and per menu applicable to the object 415 [S172]. For instance, in (18-3) of FIG. 18, a security function for an image among the display items on the selected object 415 is set and a security function for a phonebook editing menu among menus applicable to the selected object 415 is also set. If so, referring to (18-4) of FIG. 18, an image of the selected object 415 is locked in the display so as not to be viewed. And, the phonebook editing menu among the menus applicable to the selected object 415 is locked to display that the corresponding menu is not executable [S173].

Figure 19:
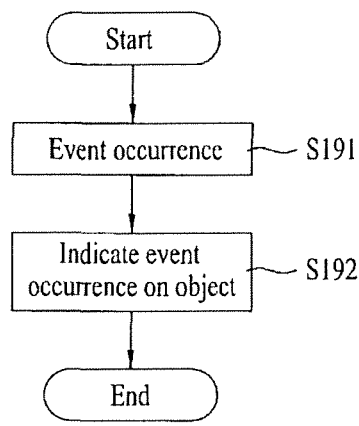
FIG. 19 is a flowchart of a method of controlling a mobile terminal according to a fifth embodiment.
Figure 20:
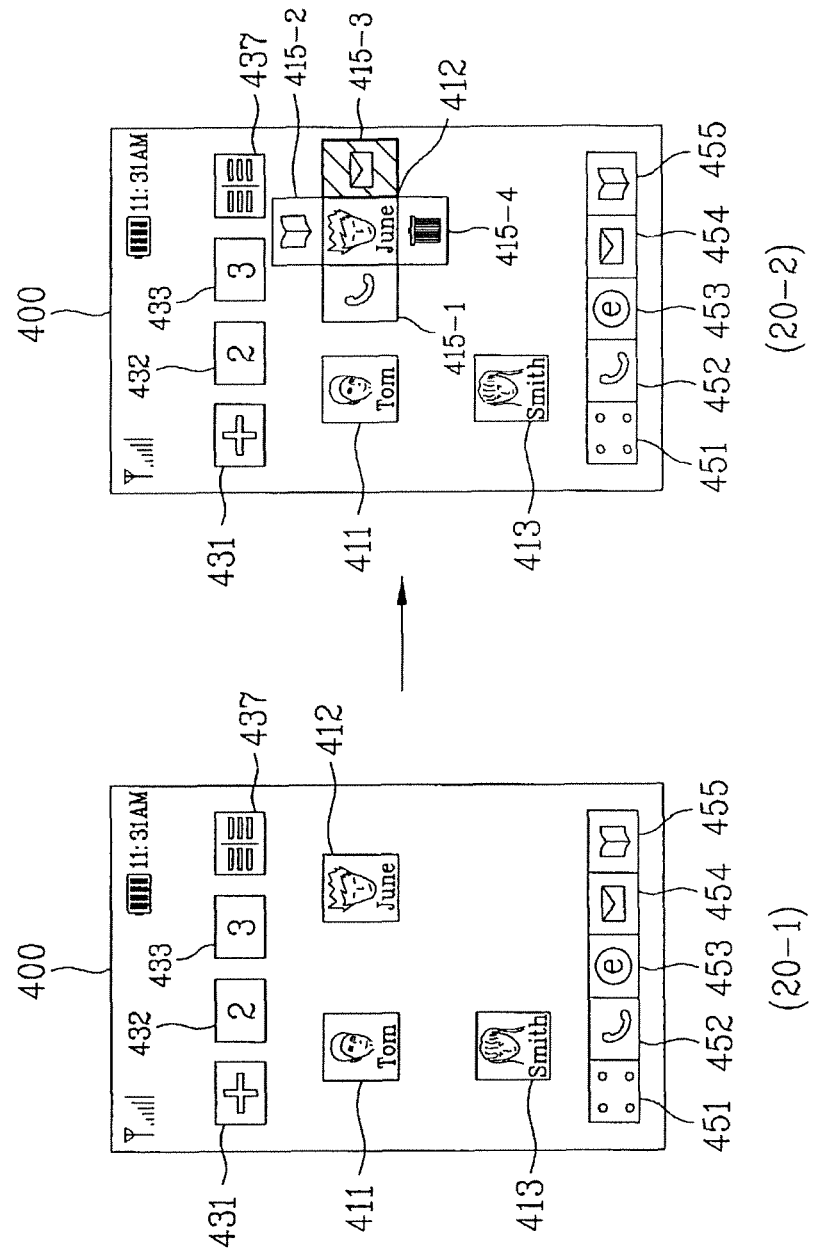
FIG. 20 is another diagram of a display screen on which a method of controlling a mobile terminal according to a fifth embodiment is implemented.

Referring to (20-1) of FIG. 20, a second folder is activated on the touchscreen 400 and objects 414 and 415 belonging to the second folder 431 are displayed on the touchscreen 400. Referring to FIG. 19, in the mobile terminal 100, an event associated with a contact of a specific object 415 takes place [S191]. In the following description, assume that the event is a message reception from the contact. If so, the fact of the message reception is indicated on the specific object 415 [S192]. In (20-2) of FIG. 20, exemplarily shown is that a message transmission/reception relevant menu icon 415-3 among menu icons of the specific object 415 is visually discriminated from the rest of the menu icons 415-1, 415-2 and 415-4.

Therefore, a mobile terminal 100 user is facilitated to recognize the fact of the message reception. It will be apparent to those skilled in the art that the present disclosure can be specified into other forms without departing from the spirit or scope of the disclosure. For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the mobile terminal 100.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modification that fall within the scope of the claims, or equivalents of such scope are therefore intended to be embraced by the appended claims.

What is claimed is:

1. A mobile phone, comprising:
a touchscreen; and
a controller configured to:
control the touchscreen to display an object concurrently with a first folder icon on a standby screen of the touchscreen when the mobile phone is in a standby mode, wherein the object is displayed in a region outside the first folder icon on the touchscreen;
move the displayed object to the first folder icon on the touchscreen when the displayed object is touched and dragged to the first folder icon;
prevent the displayed object from being associated with the first folder icon such that the displayed object remains displayed in the region outside the first folder icon on the touchscreen when a number of other objects currently associated with the first folder icon is a maximum number; and
associate the displayed object with the first folder icon such that the displayed object is no longer displayed in the region outside the first folder icon on the touchscreen when the number of the other objects currently associated with the first folder icon is less than the maximum number,
wherein the maximum number is preset such that the maximum number of the other objects currently associated with the first folder icon are concurrently viewable on the touchscreen when the first folder icon is selected.

2. The mobile phone of claim 1, wherein:
the controller is further configured to control the touchscreen to selectively display one or more menu icons in response to selection of the displayed object;
the one or more menu icons have a functional association or informational association with the selected displayed object; and
selection of one of the one or more menu icons provides additional information about the selected displayed object or establishes a dynamic relationship between the selected displayed object and the one or more menu icons in order to perform an operation related to the selected displayed object.

3. The mobile phone of claim 2, wherein the controller is further configured to:
control the touchscreen to display the displayed object as a graphical representation of the displayed object; and
receive the selection of the displayed object via a user interaction with the graphical representation of the displayed object on the touchscreen.

4. The mobile phone of claim 3, wherein the controller is further configured to execute a menu function corresponding to a selected one of the one or more menu icons.

5. The mobile phone of claim 4, wherein establishing the dynamic relationship between the selected displayed object and the one or more menu icons is based on receipt of a drag and drop input of the selected displayed object onto the one of the one or more menu icons.

6. The mobile phone of claim 3, wherein:
the controller is further configured to display a second folder icon concurrently with the first folder icon on the touchscreen and an indication that the displayed object is associated with the first folder icon or the second folder icon.

7. The mobile phone of claim 6, wherein the controller is further configured to apply a lock function to one of the first folder icon or the second folder icon.

8. The mobile phone of claim 6, wherein the controller is further configured to generate a subfolder and to place objects belonging to a specific one of the first folder icon or the second folder icon into the subfolder when the objects belonging to the specific one of the first folder icon or the second folder icon are displayed on the touchscreen.

9. The mobile phone of claim 8, wherein the controller is further configured to apply a lock function to the subfolder.

10. The mobile phone of claim 6, wherein the controller is further configured to associate an object associated with a phonebook of the mobile phone with the first folder icon or the second folder icon.

11. The mobile phone of claim 2, wherein the controller is further configured to receive a selection of which of the one or more menu icons is to be displayed in advance of the selection of the displayed object.

12. The mobile phone of claim 2, wherein:
the selected displayed object is associated with a contact; and
interaction with the selected displayed object provides access to at least a name, a phone number, an e-mail address or a homepage address of the contact.

13. The mobile phone of claim 12, wherein the controller is further configured to control the touchscreen to display, on the selected displayed object, at least the name of the contact, the phone number of the contact, the e-mail address of the contact, the homepage address of the contact, or an image linked with the selected displayed object.

14. The mobile phone of claim 13, wherein the controller is further configured to indicate that there is no linked image when no image is linked with the selected displayed object.

15. The mobile phone of claim 13, wherein the controller is further configured to control the touchscreen to display a preset replacement image on the selected displayed object when no image is linked with the selected displayed object.

16. The mobile phone of claim 13, wherein the controller is further configured to control the touchscreen to sequentially display at least two images that are linked with the selected displayed object.

17. The mobile phone of claim 13, wherein the image linked with the selected displayed object includes at least a still picture, a moving picture, or a flash picture.

18. The mobile phone of claim 13, wherein the controller is further configured to provide a lock function to prevent access to information associated with the selected displayed object when the selected displayed object is in a locked state.

19. The mobile phone of claim 18, wherein the controller is further configured to control the touchscreen to display an identifier in association with the selected displayed object to indicate that the selected displayed object is in the locked state.

20. The mobile phone of claim 2, wherein the controller is further configured to receive input to lock the selected displayed object.

21. The mobile phone of claim 2, wherein the controller is further configured to control the touchscreen to display one of the one or more menu icons associated with the selected displayed object and with an event to be visually discriminated from a remainder of displayed menu icons when the event occurs.

22. The mobile phone of claim 1, wherein the controller is further configured to control the touch screen to visually inform that the displayed object is prevented from being associated with the first folder icon.

23. The mobile phone of claim 1, wherein the controller is further configured to resize the displayed object when the displayed object is correctly moved to the first folder icon.

24. The mobile phone of claim 23, wherein the controller is further configured to reduce a size of the displayed object when the displayed object is correctly moved to the first folder icon.

25. A method of controlling a mobile phone, the method comprising:

- controlling a touchscreen of the mobile phone, via a controller of the mobile phone, to display an object concurrently with a first folder icon on a standby screen of the touchscreen when the mobile phone is in a standby mode, wherein the object is displayed in a region outside the first folder icon on the touchscreen,
- controlling the touchscreen, via the controller, to move the displayed object to the first folder icon on the touchscreen when the displayed object is touched and dragged to the first folder icon;
- preventing the displayed object, via the controller, from being associated with the first folder icon such that the displayed object remains displayed in the region outside the first folder icon on the touchscreen when a number of other objects currently associated with the first folder icon is a maximum number; and
- associating the displayed object, via the controller, with the first folder icon such that the displayed object is no longer displayed in the region outside the first folder icon on the touchscreen when the number of the other objects currently associated with the first folder icon is less than the maximum number,
- wherein the maximum number is preset such that the maximum number of the other objects currently associated with the first folder icon are concurrently viewable on the touchscreen when the first folder icon is selected.

* * * * *